Dec. 3, 1963 L. ROSEN 3,112,724
DEEP DIVING SUBMARINE
Filed Feb. 8, 1961 2 Sheets-Sheet 1
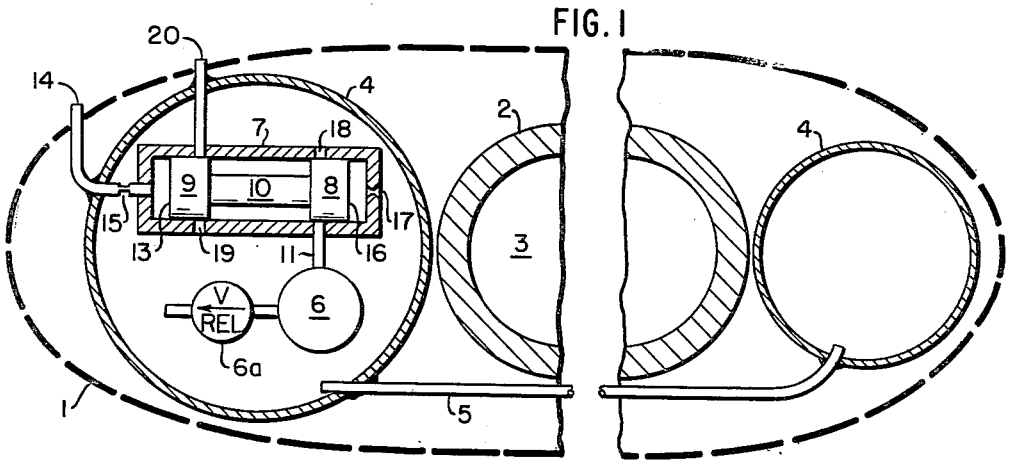
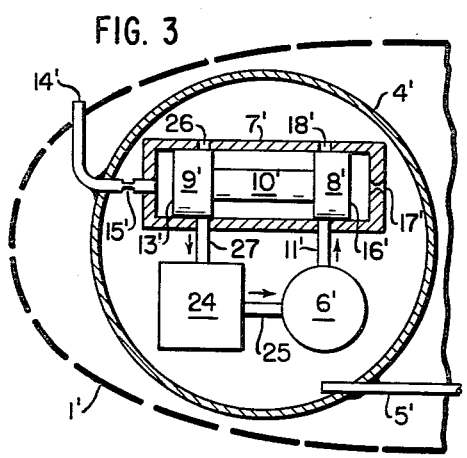
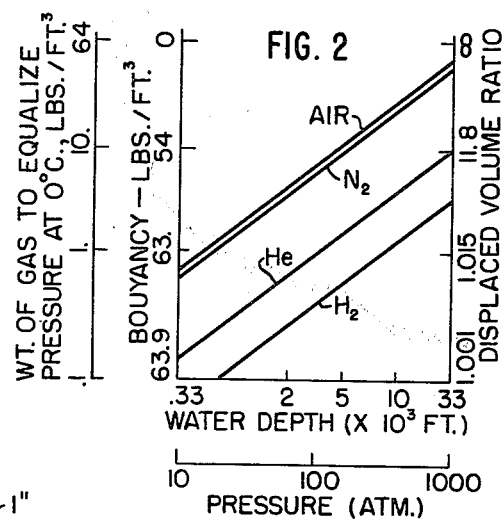
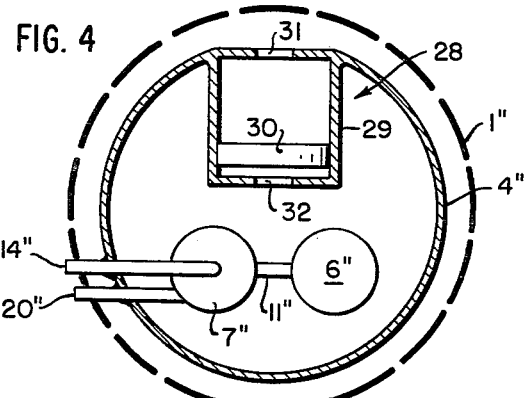
INVENTOR.
Leo Rosen
BY Kenway, Jenney & Hildreth
ATTORNEYS

United States Patent Office 3,112,724
Patented Dec. 3, 1963

3,112,724
DEEP DIVING SUBMARINE
Leo Rosen, Middletown, Conn., assignor to ANelex Corporation, Boston, Mass., a corporation of New Hampshire
Filed Feb. 8, 1961, Ser. No. 87,899
2 Claims. (Cl. 114—16)

This invention relates to submarines and more particularly to an improved submarine capable of operation in sea depths as great as about 30,000 feet.

In conventional submarines, a pressure hull is utilized, which must be capable of withstanding the sea pressure at the greatest depth at which the submarine is designed to operate, and yet must have positive buoyancy. With presently known materials and techniques of fabrication, the conflicting requirements of adequate strength and buoyancy limit the depths to which a submarine may be designed to operate.

It has previously been proposed to construct a submarine combining a relatively small but strong pressure vessel having negative buoyancy, which would provide space for crew and equipment, with a relatively large float filled with a buoyant but substantially incompressible material, so that the float could be lightly constructed and thus afford a net positive buoyancy. Gasoline, for example, has been used as a buoyant, incompressible material in such a float. The disadvantage of this approach is that known buoyant incompressible materials have a density only slightly less than that of water, so that the float must have a relatively large volume as compared to the pressure vessel.

It is the primary object of this invention to provide a submarine having positive buoyancy although comprising a pressure vessel and a float of a volume not substantially greater than the volume of the pressure vessel.

It is a further object of this invention to provide a float which is capable of affording positive buoyancy to a submarine having a pressure vessel, without substantially increasing the dimensions of the submarine hull over those necessary to enclose the pressure vessel.

According to the present invention, these objects are carried out in part by utilizing a liquidized gas as a buoyant material, and expanding the gas to equalize the pressure in the interior of a float chamber to that of the surrounding sea water. A pressure vessel which can withstand sea pressures at depths down to about 30,000 feet may be manufactured by present day methods to have a displacement equal to about one-half of its weight. By utilizing the present invention, it is possible to provide a submarine with positive buoyancy by means of a float whose volume is not more than about one and one-half times the volume of the pressure vessel. In carrying out the invention, I provide means for controlling the rate of evaporation of liquidized gas to maintain a pressure within the float equal to the increasing sea pressure during a descent, and means for releasing the evaporated gas from the float as the surrounding sea pressure decreases during a subsequent ascent. In this embodiment, a new supply of liquidized gas must be provided for each descent. In the case of submarines in which multiple submersions must be made without a fresh supply of liquid gas, I provide means for recompressing the gas in the float to a liquid state as an ascent is made, rather than releasing the gas from the float.

In a further modification, provision for very rapid changes in depth is made by providing an expansible chamber device operable by sea water pressure to compress the gas rapidly in the float chamber during a descent, and to expand the gas rapidly during an ascent. It is thus possible to maintain an equalized pressure by the evaporation of liquidized gas and by the release or reliquidization of gas at a slower rate than the rate of change in depth would dictate.

In another modification in which a supply of liquidized gas is retained in an insulated container, heat exchange means are provided for exposing a flow of the liquidized gas to the heat of the surrounding sea for maintaining an adequate gas pressure in the container. In the absence of these means, the liquidized gas may not evaporate with sufficient rapidity to maintain a pressure in the container in excess of that in the float chamber. Means for regulating the rate of flow through the heat exchanger in response to the pressure differential between the container and the float chamber are provided to insure that ample gas pressure is available at all times.

In still another modification, rapid evaporation of the liquidized gas is achieved by spraying the liquid directly against the interior surface of the float chamber for improved heat exchange with the surrounding sea. The flow of liquid to a spray nozzle is controlled by the pressure differential between the interior of the float chamber and the surrounding sea.

In any of the aforementioned embodiments, I may provide excess pressure-relief valves for the liquidized gas, which may discharge pressurized gas into the float chamber and thence through a second pressure relief valve to the sea, or directly into the sea.

While the specification concludes with claims particularly pointing out and distinctly claiming the subject matter which I regard as my invention, it is believed that the invention will be better understood from the following detailed description of a preferred embodiment thereof, taken in connection with the accompanying drawing, in which:

FIG. 1 is a schematic sectional view of a submarine according to a first embodiment of the invention, showing a control valve on an enlarged scale;

FIG. 2 is a diagram showing certain inherent physical characteristics of the operation of the submarine;

FIG. 3 is a schematic sectional view of a portion of a submarine showing a first modification of the invention;

FIG. 4 is a schematic end view in section of a submarine, showing still another modification;

Figure 5:
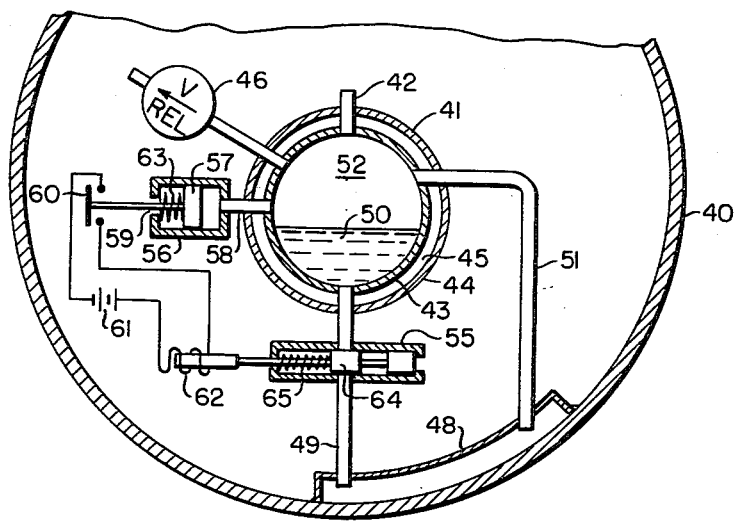
FIG. 5 is a schematic end view in section of a submarine, showing another form of the invention.

Referring to FIG. 1, the outer hull of the submarine is designated by broken lines at 1. This hull is not a pressure vessel, but is open to sea water pressure, and provides a housing for equipment which is not sensitive to high water pressure. Within the hull, I mount a conventional pressure vessel 2 which forms a pressure-tight enclosure 3 for equipment and crew. According to well-known construction techniques, the pressure vessel may have sufficient strength to withstand an external pressure of about 1,000 atmospheres, or that which is encountered at a depth of about 33,000 feet, with a buoyancy equal to about half its weight, i.e., with a density about twice as great as its displacement. In order to afford positive flotation to the submarine, I provide one or more float chambers 4, of which two are shown in the embodiment of FIG. 1, and these are interconnected in fluid-flow relation by conduit means 5. The float chambers are relatively lightly constructed because according to the invention, they are not subjected to relatively substantial pressure differentials upon their interior and exterior surfaces. They must, however, be fluid-tight and capable of withstanding transient pressure differentials induced by changes in depth which are too rapid to be compensated immediately by the pressure control system.

The submarine in FIG. 1 is equipped to make a single dive before re-servicing, and is not adapted to undergo repeated changes in depth during the dive. Such a submarine is suitable for unmanned operations. A supply of a liquidized gas is charged in a suitable insulated container 6 within the float chamber, and no means is provided for re-liquidizing the gas after its evaporation. The gas is released at a controlled rate for evaporation to increase the pressure within the chamber as the sea water pressure increases during a descent.

An excess pressure-relief valve 6a is connected with the container 6 to release pressure in excess of a predetermined safe limit into the float chamber. An unsafe build-up of pressure might otherwise result from excessive heat transfer to the container, particularly in those applications in which the container is not well insulated.

For the purpose of controlling the rate of evaporation of the liquidized gas, a control valve 7 is provided, including a first valve member 8 and a second valve member 9 which are mechanically connected by a reduced portion 10. The container 6 communicates with the interior of the valve 7 by means of a conduit 11, which is normally closed by the valve member 8 when the valve is in a neutral position as shown. Sea water pressure is applied to an axial face 13 of the valve member 9 by means of a conduit 14 communicating with the exterior surface of the hull. A flow restrictor 15 is imposed in the conduit 14 to limit hunting action of the valve, and this arrangement permits a moderate differential pressure to exist on the interior and exterior surface of the float chamber. The pressure of the interior of the chamber is applied to an axial face 16 of the valve member 8 through a flow restrictor orifice 17 formed in the opposite end wall of the valve 7. The valve members are thus subjected in opposing relation to the pressure of the sea water about the hull and the gas pressure within the float chamber.

During a descent, the increasing sea water pressure drives the valve members to the right as seen in FIG. 1, communicating the conduit 11 with an outlet port 18, across the reduced portion 10. The liquidized gas escapes through the port 18 into the float chamber and evaporates, increasing the pressure to a value substantially equal to that of the sea water, and thus returning the valve members toward the position of FIG. 1 to discontinue the release of liquidized gas.

During a subsequent ascent, the gas pressure of the float drives the valve members to the left as viewed in FIG. 1, opening communication between the interior and the exterior of the chamber through a port 19 and a conduit 20, across the reduced portion 10. As the pressures are equalized, the valve members are returned to the neutral position shown, and the escape of gas from the float ceases. The evaporated gas in the chamber is thus permitted to escape in a controlled manner to maintain substantially equal pressures interiorly and exteriorly of the chamber.

It is within the scope of presently known techniques to provide a float chamber whose buoyancy is about twice as great as its displacement, with the result that the float chambers 4 need only be equal to or slightly greater in volume than the pressure vessel 2.

Referring to FIG. 2, the characteristics of several gases with respect to their use in the float chamber of this invention are depicted graphically. The sea water pressure in atmospheres is shown on a log scale, together with the corresponding water depths. The weight of gas per cubic foot of float volume necessary to equalize the sea water pressure at 0° C., the resulting buoyancy per cubic foot of the float, and the ratio of the weight of the displaced water to the buoyancy of the displacing gas, are depicted on the ordinate. The characteristics of air, nitrogen, helium, and hydrogen are shown. The characteristic linear relationship is based on the assumption that these materials behave as perfect gases. Furthermore, the effects of the salinity of sea water are not considered. It is apparent that the lighter gases, helium and hydrogen, are preferable from the standpoint of maximum buoyancy, and would require relatively small float volumes. While the cost of producing liquid helium is considerably greater than that for liquid air, the difference in buoyancy is an overbalancing factor where minimum float volume is the primary consideration. However, the risk of explosion incurred with hydrogen may make its use undesirable.

A modified system suitable for repeated dives and therefore appropriate for a manned vessel is shown in FIG. 3. Parts similar to those of FIG. 1 are similarly numbered with prime superscripts. Means for re-liquidizing the evaporated gas within the chamber 4′, generally designated 24, are provided to accommodate cyclical pressure variations with a small initial charge of liquidized gas in the container 6′. The re-liquidizer 24 may be of any conventional type well known in the art, generally comprising refrigeration and compression means. A conduit 25 is connected to supply the container 6′ with liquid gas from these means.

In the event that the gas pressure within the chamber 4′ exceeds the exterior sea water pressure, the valve members 8′ and 9′ are driven to the left as viewed in FIG. 3, communicating the interior of the chamber with the re-liquidizer 24 by means of a port 26 formed in the valve 7′ and a conduit 27. The re-liquidizer is controlled by conventional pressure responsive means (not shown) to liquidize gas received through conduit 27 when the latter is in communication with the interior of the chamber. The system is thus effective to maintain a pressure interiorly of the chamber substantially equal to that of the surrounding sea water during repeated dives. Alternatively, the conduit 27 may withdraw gas directly from the interior of the chamber, being regulated by suitable means to maintain at least a predetermined minimum supply of liquidized gas within the container 6′.

A further modification of the system is shown in FIG. 4, in which parts similar to those of FIG. 1 are similarly numbered with double prime superscripts. In this embodiment, expansible chamber means 28 are provided to afford a more rapid transient response of the float pressure to external changes in sea pressure, thus permitting more rapid dives without damage to the float chamber. The expansible chamber means 28 comprises a cylinder 29 slidably receiving a piston 30 therein. A port 31 is opened to the sea to expose the upper face of the piston to the sea pressure, while a port 32 communicates the gas pressure of the float to the lower surface of the piston. During a rapid descent, the increasing sea water pressure forces the piston 30 downwardly, thus compressing the gas within the chamber rapidly to maintain pressure equilibrium, although the valve 7″ is incapable of releasing the liquid gas at a sufficiently rapid rate to maintain pressure equilibrium by its own action. Similarly, during a rapid ascent, the gas pressure within the chamber forces the piston upwardly and thus affords a rapid transient pressure response even though the valve 7″ is incapable of releasing gas through the conduit 20″ with sufficient rapidity to achieve this end. Various expansible chamber devices well known in the art and suitable for particular applications may be substituted for the cylinder 29 and the piston 30.

In another modification shown in FIG. 5, an insulated liquidized gas container 41 communicates with a control valve (not shown), similar to the control valve 7 in the embodiment of FIG. 1, by means of a conduit 42. The container 41 is mounted within a float chamber 40. The container is of an insulated type, including inner and outer shells 43 and 44, respectively, radially spaced apart to form an insulating space 45, which may be evacuated, or may alternatively be filled with a suitable insulating material. A safety pressure-relief valve 46 communicates with the interior of the container to relieve pressures in excess of a predetermined safe limit, by releasing a portion of the gas to the interior of the float chamber.

The insulation of the container may limit heat transfer to a rate insufficient to evaporate the liquidized gas rapidly enough to maintain a pressure in excess of that of the float chamber. The rate of increase in the pressure of the float chamber to balance an increasing sea pressure would thus be limited by the rate of heat transfer to the container, and a catastrophic pressure differential may arise. In order to prevent this contingency, I provide a heat exchanger 48 mounted upon the interior surface of the float chamber in heat exchange relationship with the surrounding sea. A conduit 49 normally communicates the supply of liquidized gas 50 with the heat exchanger, and a conduit 51 is provided to return the evaporated gas to the upper portion of the container, in which a supply of evaporated gas 52 is confined. For regulating the rate of evaporation to maintain the pressure of the gas supply 52 at a desired value in excess of the pressure obtaining in the float chamber, a flow control valve 55 is interposed in the conduit 49, and is arranged to be actuated by a differential pressure regulator 56. The construction of these elements shown in the drawings is intended for purposes of illustration only, and these elements may be of any suitable types, such as are well-known in the art. The regulator includes a piston 57, which is subjected to the pressure of the gas supply 52 through a conduit 58, and to the pressure of the float chamber 40 through an opening 59 in the valve. The piston 57 carries a bridging contact 60, which is arranged to close a circuit between a battery 61 and a solenoid 62 when the chamber pressure approaches the container pressure. A spring 63 biases the piston 57 to the right as viewed in FIG. 5, so that balance is achieved when the chamber pressure is somewhat less than the container pressure. Energization of the solenoid 62 draws a valve member 64 of the valve 55 to the left as viewed in FIG. 5, opening communication between the supply of liquidized gas 50 and the heat exchanger 48 to evaporate an additional quantity of the gas and thus increase the container pressure. When the container pressure reaches a value sufficient to balance the chamber pressure and the bias of the spring 63, the regulator is actuated to open the bridging contact 60 to de-energize the solenoid 62 for closure of the valve 55. A compression spring 65 biases the valve member 64 toward the closed position. By these means, the container pressure is maintained a predetermined amount in excess of the chamber pressure, insuring that pressurized gas is always available for release to the float chamber to balance the sea water pressure acting thereupon.

Figure 6:
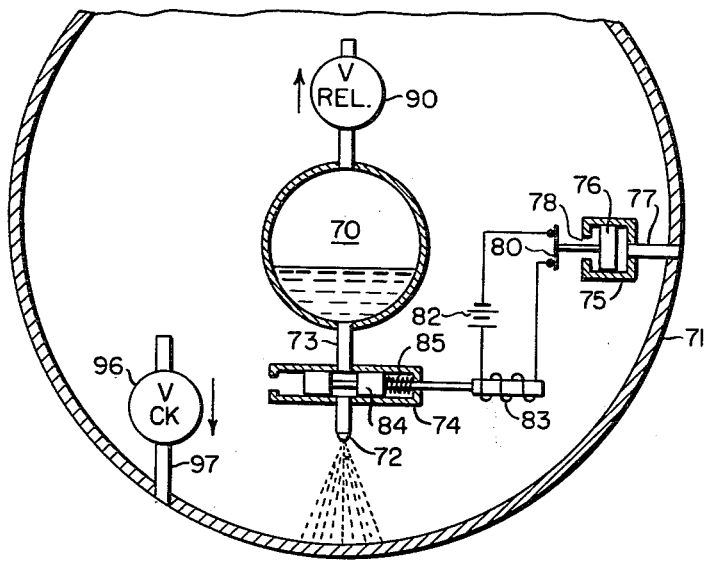
FIG. 6 is a schematic end view in section of a submarine showing still another modification.

Referring to FIG. 6 still another modification is shown in which evaporation is accomplished by spraying the liquidized gas from an insulated container 70 directly against the interior surface of a float chamber 71, for rapid heat exchange with the surrounding sea. For this purpose, I provide a spray nozzle 72 which is normally connected with the container 70 by a conduit 73. A control valve 74 is interposed in the conduit, and a differential pressure regulator 75 is arranged to control the rate of evaporation of the liquidized gas in response to the differential in pressure between the float chamber and the surrounding sea. The regulator 75 includes a piston 76 which is subjected on one face to the sea pressure through a conduit 77, and on the opposite face to the chamber pressure through an opening 78. The piston is connected to a bridging contact 80. Upon an increase in the sea pressure, the regulator closes the bridging contact to energize a solenoid 83 by means of a battery 82. The solenoid drives a valve member 84 to the right as viewed in FIG. 6, thus opening communication of the container 70 with the nozzle 72. Liquidized gas is sprayed upon the interior surface of the float chamber and is rapidly evaporated through heat exchange with the exterior sea water. As the gas pressure in the float chamber increases to balance the sea pressure, the regulator opens the bridging contact 80 and the valve member 84 closes the conduit 73 under the bias of a compression spring 85.

To prevent the build-up of a dangerous level of pressure in the container 70 when the control valve 74 is closed, I provide a safety pressure-release valve 90 to relieve container pressures in excess of a predetermined safe limit. Additionally, a check valve 96 of any suitable type is arranged to relieve float chamber pressures in excess of the sea pressure through a conduit 97. By this arrangement, the pressure of the float chamber is maintained in balance with the sea pressure, and unsafe pressures which may arise in the container are relieved.

While I have shown and described various embodiments of my improved invention, it will be apparent that various changes and modifications may occur to those skilled in the art without departing from the spirit and scope of the invention. I therefore intend to cover all such changes and modifications in the appended claims.

What I claim and desire to secure by Letters Patent of the United States is:

1. In a submarine, flotation means comprising in combination: a float chamber; means for supplying liquidized gas including an insulated container; heat exchange means connected to pass a flow of liquidized gas from said container in heat exchange relation with exterior sea water through a wall of said float chamber for evaporating the gas, said heat exchange means being connected to return the evaporated gas to said container; first differential pressure-responsive valve means for regulating the flow of liquidized gas to said heat exchange means to maintain the pressure of evaporated gas in said container a predetermined amount in excess of the gas pressure in said float chamber; second differential pressure-responsive valve means for releasing evaporated gas from said container into said chamber upon a relative rise in ambient sea water pressure and for releasing gas to the exterior from said chamber upon a relative rise in chamber pressure, to regulate the gas pressure in said chamber for maintaining approximate equality with the pressure of sea water about the submarine with rapid transient response to variations in sea water pressure.

2. In a submarine, flotation means comprising in combination: a float chamber; means for supplying liquidized gas including an insulated container; heat exchange means connected to pass a flow of liquidized gas from said container in heat exchange relation with exterior sea water through a wall of said float chamber for evaporating the gas, said heat exchange means being connected to return the evaporated gas to said container; first differential pressure-responsive valve means subjected to the gas pressures in said container and said chamber, for regulating the flow of liquidized gas to said heat exchange means, said first valve means including biasing means for maintaining the pressure of evaporated gas in said container a predetermined amount in excess of the gas pressure in said float chamber, second differential pressure-responsive valve means for releasing evaporated gas from said container into said chamber upon a relative rise in ambient sea water pressure and for releasing gas to the exterior from said chamber upon a relative rise in chamber pressure, to regulate the gas pressure in said chamber for maintaining approximate equality with the pressure of sea water about the submarine with rapid transient response to variations in sea water pressure.

References Cited in the file of this patent

UNITED STATES PATENTS

| | | |
|---|---|---|
| 399,693 | Poore | Mar. 19, 1889 |
| 1,131,712 | Klein | Mar. 16, 1915 |
| 2,060,670 | Hartman | Nov. 10, 1936 |
| 2,412,205 | Cook | Dec. 10, 1946 |
| 2,550,886 | Thompson | May 1, 1951 |
| 2,784,559 | Kajmo | Mar. 12, 1957 |
| 2,944,405 | Basore | July 12, 1960 |

FOREIGN PATENTS

| | | |
|---|---|---|
| 21,132 | Germany | Feb. 7, 1883 |
| 180,272 | Germany | Jan. 30, 1907 |
| 696,215 | Great Britain | Aug. 26, 1953 |